(12) United States Patent
Soto et al.

(10) Patent No.: US 9,168,550 B1
(45) Date of Patent: Oct. 27, 2015

(54) REUSABLE VALVE ASSEMBLY

(71) Applicants: Brian Soto, Meriden, CT (US); Pedro Soto, Meriden, CT (US)

(72) Inventors: Brian Soto, Meriden, CT (US); Pedro Soto, Meriden, CT (US)

(*) Notice: Subject to any disclaimer, the term of this patent is extended or adjusted under 35 U.S.C. 154(b) by 301 days.

(21) Appl. No.: 13/840,300

(22) Filed: Mar. 15, 2013

(51) Int. Cl.
A62C 11/00 (2006.01)
B05B 11/00 (2006.01)
B65D 83/44 (2006.01)

(52) U.S. Cl.
CPC .......... B05B 11/0005 (2013.01); B65D 83/44 (2013.01)

(58) Field of Classification Search
CPC .......... B05B 7/24; B05B 9/043; B05B 9/047
USPC .................. 239/302, 333, 356, 360
See application file for complete search history.

(56) References Cited

U.S. PATENT DOCUMENTS

| 358,989 A | 3/1887 | Sanor |
| 3,795,350 A | 3/1974 | Shay |
| 4,109,869 A | 8/1978 | Brockelsby et al. |
| 5,639,026 A | 6/1997 | Woods |
| 5,975,435 A | 11/1999 | Whited, II |
| 6,085,997 A | 7/2000 | Mills et al. |
| 2004/0116903 A1* | 6/2004 | Osman .................. 604/543 |

* cited by examiner

Primary Examiner — Davis Hwu

(57) ABSTRACT

A reusable valve assembly includes a cap that may be removably coupled to the aerosol can. A conduit is coupled to the cap so the conduit is selectively operationally coupled to the aerosol can. A wheel is movably coupled to the cap so the wheel may adjust a rate of delivery of a fluid from the conduit. A tip is operationally coupled to the cap so the tip may selectively direct the delivery of the fluid from the aerosol can.

13 Claims, 4 Drawing Sheets

REUSABLE VALVE ASSEMBLY

BACKGROUND OF THE DISCLOSURE

Field of the Disclosure

The disclosure relates to reusable valve devices and more particularly pertains to a new reusable valve device for precisely adjusting a flow of fluid from an aerosol can.

SUMMARY OF THE DISCLOSURE

An embodiment of the disclosure meets the needs presented above by generally comprising a cap that may be removably coupled to the aerosol can. A conduit is coupled to the cap so the conduit is selectively operationally coupled to the aerosol can. A wheel is movably coupled to the cap so the wheel may adjust a rate of delivery of a fluid from the conduit. A tip is operationally coupled to the cap so the tip may selectively direct the delivery of the fluid from the aerosol can.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
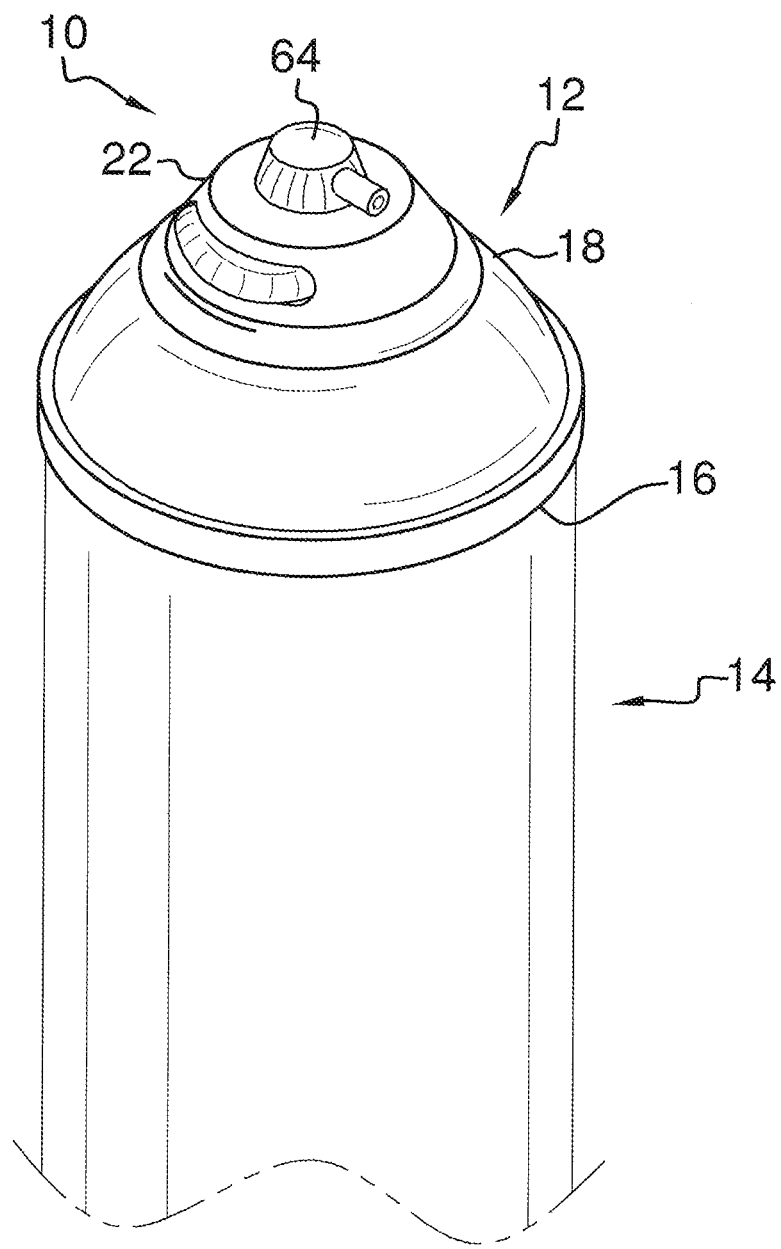
FIG. 1 is a perspective view of a reusable valve assembly according to an embodiment of the disclosure.
Figure 2:
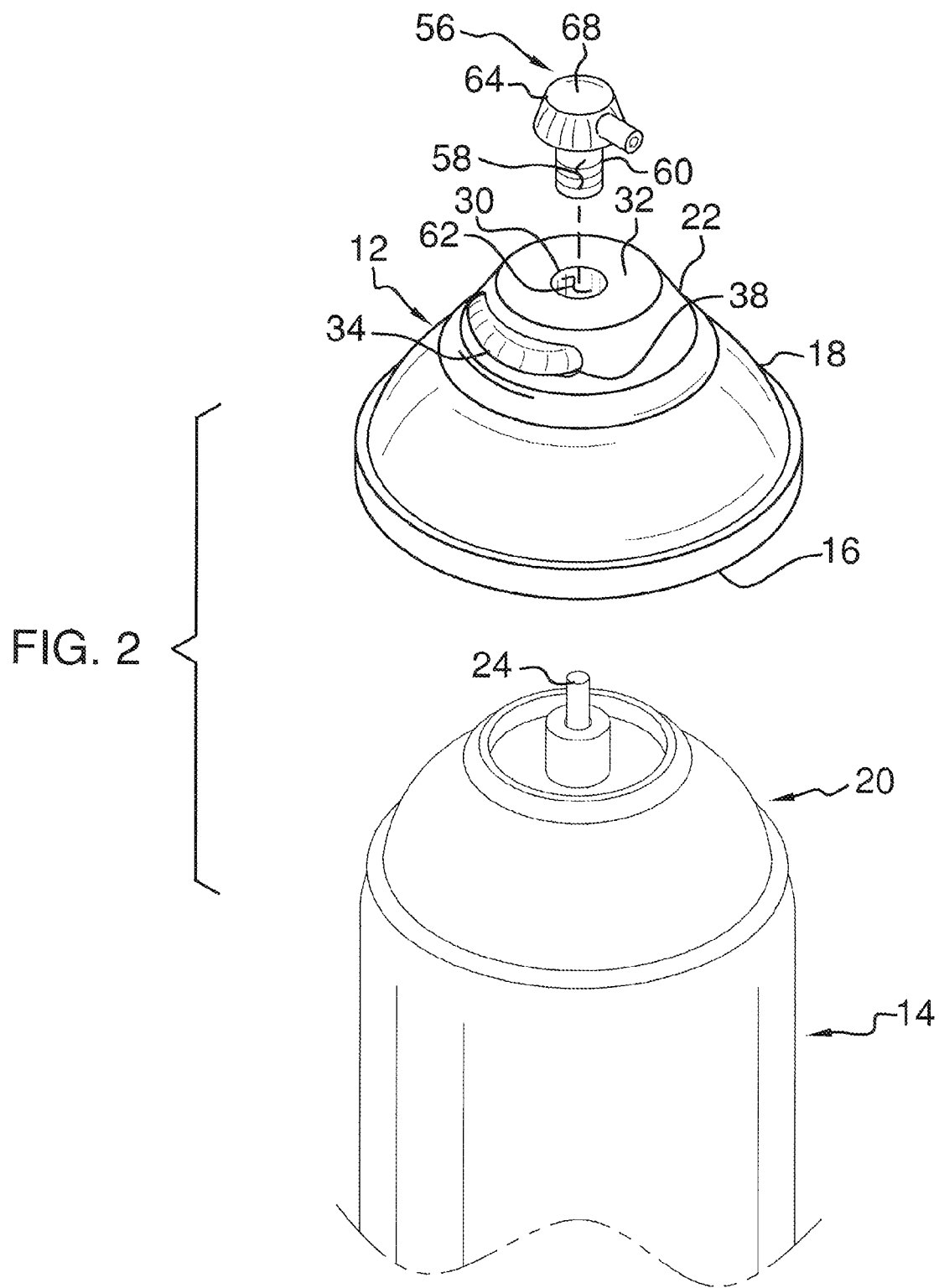
FIG. 2 is a top perspective view of an embodiment of the disclosure.
Figure 3:
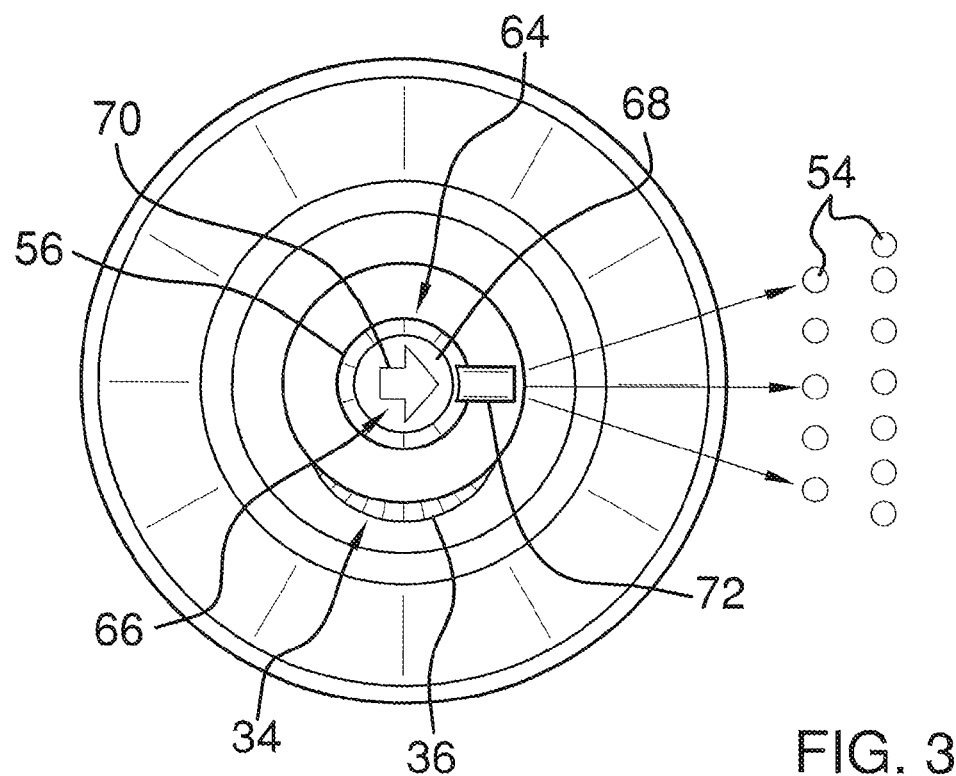
FIG. 3 is a top view of an embodiment of the disclosure.
Figure 4:
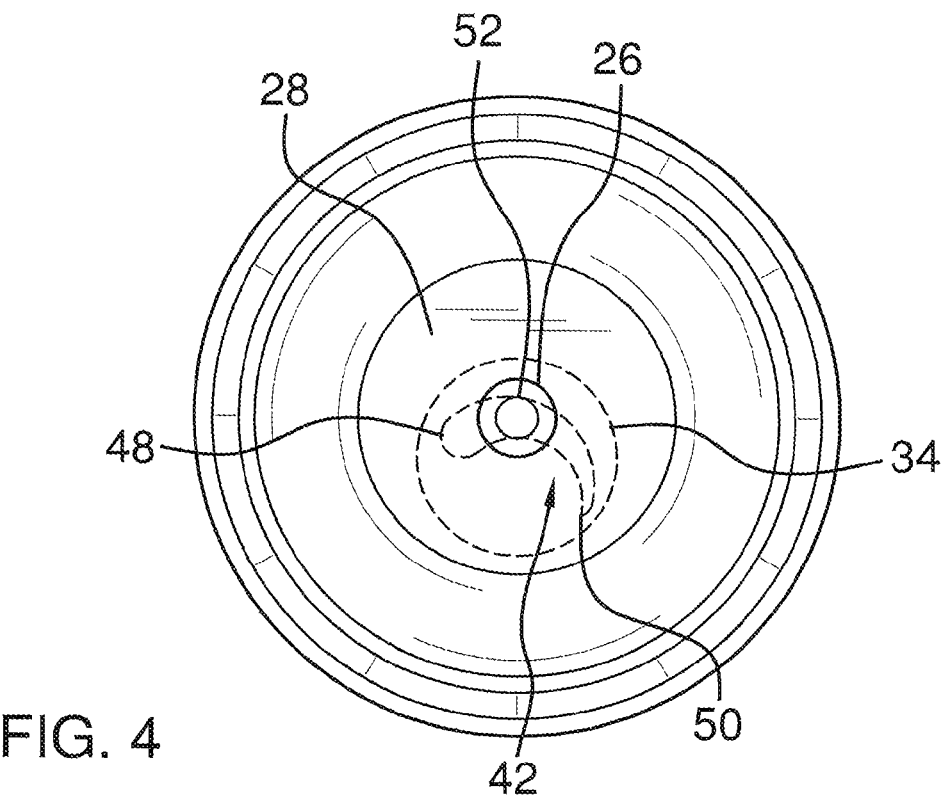
FIG. 4 is a bottom view of an embodiment of the disclosure.
Figure 5:
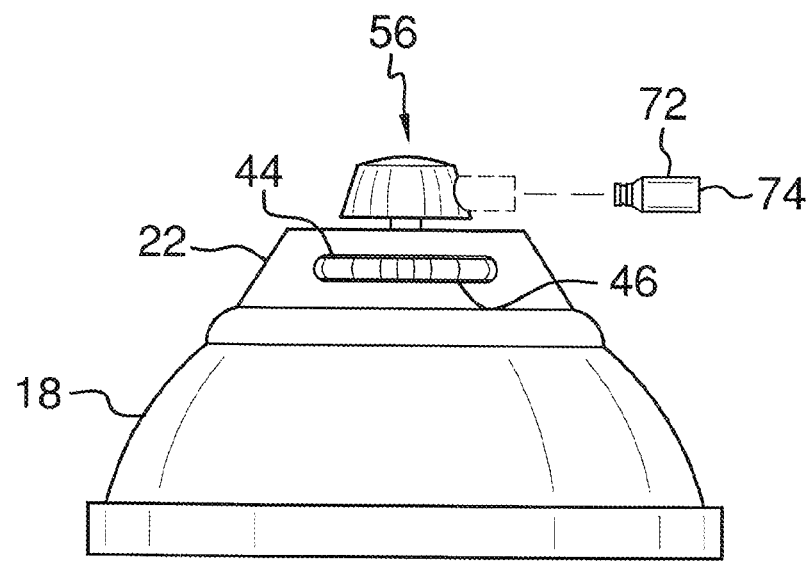
FIG. 5 is a right side view of an embodiment of the disclosure.
Figure 6:
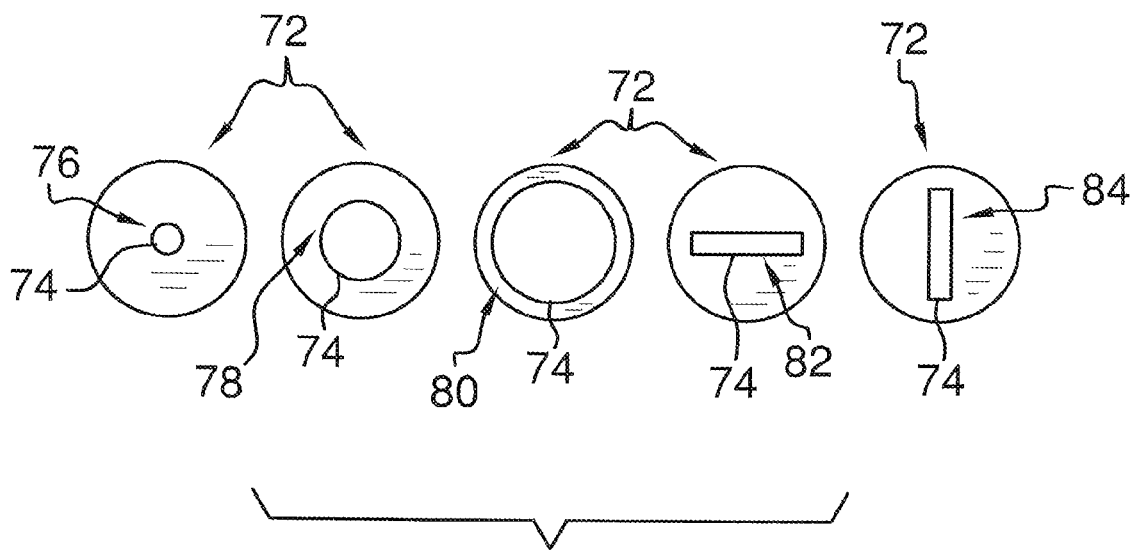
FIG. 6 is a front view of an embodiment of the disclosure.

With reference now to the drawings, and in particular to FIGS. 1 through 6 thereof, a new reusable valve device embodying the principles and concepts of an embodiment of the disclosure and generally designated by the reference numeral 10 will be described.

As best illustrated in FIGS. 1 through 6, the reusable valve assembly 10 generally comprises As best illustrated in FIGS. 1 through 6, the reusable valve assembly 10 generally comprises a cap 12 that is positionable on an aerosol can. 14 such that a bottom edge 16 of a dome portion 18 of the cap 12 engages a top 20 of the aerosol can 14. The cap 12 is retained on the aerosol can 14 so a housing portion 22 of the cap 12 is positioned proximate a stem 24 of the aerosol can 14. The dome portion 18 of the cap 12 is comprised of a resiliently compressible material so the dome portion 18 of the cap 12 is positionable between a compressed position and an extended position. The bottom edge 16 of the dome portion 16 of the cap 12 may have a diameter between 5 cm and 7.5 cm. The cap 12 may have a height between 2.5 cm and 7.5 cm.

A conduit 26 is coupled to and extends downwardly from a bottom 28 of the housing portion 22 of the cap 12 so the conduit 26 fluidly engages the stem 24 of the aerosol can 14 when the cap 12 is removably coupled to the aerosol can 14. The conduit 26 is in fluid communication with an interior of the housing portion 22 of the cap 12. Additionally, the conduit 26 may have length between 2 mm and 5 mm. A tip aperture 30 extends downwardly through a top 32 of the housing portion 22 of the cap 12 so the tip aperture 30 is aligned with the conduit 26. The tip aperture 30 is in fluid communication with the interior of the housing portion 22 of the cap 12.

A wheel 34 is rotatably coupled to the housing portion 22 of the cap 12 so an outside edge 36 of the wheel 34 extends outwardly from a wheel opening 38 in the housing portion 22 of the cap 12. A user 40 may adjust the position of the wheel 34 by moving the outside edge 36 of the wheel 34. Additionally, the wheel 34 may have a diameter between 1 cm and 2.5 cm. A fluid aperture 42 extends through a top 44 and a bottom 46 of the wheel 34. The wheel 34 is positioned within the interior of the housing portion 22 of the cap 12 so the fluid aperture 42 is aligned between the conduit 26 and the tip aperture 30.

The fluid aperture 42 has a curved teardrop shape so a width of the fluid aperture 42 graduates between a wide end 48 and a narrow end 50 of the fluid aperture 42. The wide end 48 of the fluid aperture 42 may have a width that is greater than or equal to a diameter of an opening 52 in the conduit 26. The narrow end 50 of the fluid aperture 42 may have a width that is less than the diameter of the opening 52 in the conduit 26. The wheel 34 is selectively positionable so the fluid aperture 42 may allow a flow of a fluid 54 to move from the conduit 26 to the tip aperture 30 between a minimum and a maximum rate. The fluid 54 may comprise a pressurized fluid 54 of any conventional design such as paint or other similar material.

A tip 56 may be selectively coupled to the cap 12. An outer surface 58 of a coupling portion 60 of the tip 56 threadably engages an inside surface 62 of the tip aperture 30 so the tip 56 is placed in fluid communication with the tip aperture 30. An engaging portion 64 of the tip 56 may be selectively depressed by the user 40 so the dome portion 18 of the cap 12 is positioned in the compressed position. The conduit 26 urges the stem 24 downwardly when the dome portion 18 of the cap 12 is positioned in the compressed position so the flow of the fluid 54 is released from the aerosol can 14. Indicia 66 may be printed on a top 68 of the engaging portion 64 of the tip 56. The indicia 66 may comprise an arrow 70 indicating a direction of the flow of the fluid 54 from the tip 56. The engaging portion 64 of the tip 56 may have a circular shape with a diameter between 1 cm and 2.5 cm.

A nozzle 72 may be removably coupled to the engaging portion 64 of the tip 56 so the nozzle 72 may direct the flow of the fluid 54 outwardly from the tip 56. The nozzle 72 extends laterally away from the tip 56 and the nozzle 72 is placed in fluid communication with the engaging portion 64 of the tip 56 when the nozzle 72 is coupled to the tip 56. Additionally, the nozzle 72 is one of a plurality of nozzles 72 and an open end 74 of each of the plurality of the nozzles 72 may have one of a plurality of shapes. The plurality of shapes may comprise a small circle 76, a medium circle 78, a large circle 80, a horizontal slot 82 and a vertical slot 84.

In use the user 40 may couple the assembly 10 to the aerosol can 14 in order to precisely adjust the flow of the fluid 54 from the aerosol can 14 between a minimum and a maximum rate. The user 40 may fluidly couple a selected one of the plurality of nozzles 72 to the tip 56 in order to produce a desired pattern of spray of the fluid 54 from the nozzle 72. The selected nozzle 72 may be used to reduce overspray of the fluid 54 or to provide a maximum coverage of the fluid 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A reusable valve assembly for removably coupling to an aerosol can, said assembly comprising:

a cap removably coupled to the aerosol can;

a conduit coupled to said cap wherein said conduit is selectively operationally coupled to the aerosol can;

a wheel movably coupled to said cap wherein said wheel adjusts a rate of delivery of a fluid from said conduit; and a tip operationally coupled to said cap wherein said tip selectively directs the delivery of the fluid from the aerosol can; and a bottom edge of a dome portion of said cap engaging a top of the aerosol can wherein said cap is retained on the aerosol can wherein a housing portion of said cap is positioned proximate a stem of the aerosol can, said dome portion of said cap being comprised of a resiliently compressible material wherein said dome portion of said cap is positionable between a compressed position and an extended position.

2. The assembly according to claim 1, further comprising said conduit being coupled to and extending downwardly from a bottom of a housing portion of said cap wherein said conduit fluidly engages a stem of the aerosol can when said cap is removably coupled to the aerosol can.

3. The assembly according to claim 1, further comprising a tip aperture extending downwardly through a top of a housing portion of said cap wherein said tip aperture is aligned with said conduit.

4. The assembly according to claim 1, further comprising said wheel being rotatably coupled to a housing portion of said cap wherein an outside edge of said wheel extends outwardly from a wheel opening in said housing portion of said cap.

5. The assembly according to claim 4, further comprising a fluid aperture extending through a top and a bottom of said wheel wherein said fluid aperture is aligned between said conduit and a tip aperture.

6. The assembly according to claim 5, further comprising said fluid aperture having a curved teardrop shape wherein said fluid aperture has a wide end and a narrow end.

7. The assembly according to claim 6, further comprising said wheel being selectively positionable wherein said fluid aperture allows a flow of a fluid to move from said conduit to said tip aperture between a minimum and a maximum rate.

8. The assembly according to claim 1, further comprising an outer surface of a coupling portion of said tip threadably engaging an inside surface of a tip aperture wherein said tip is placed in fluid communication with said tip aperture.

9. A reusable valve assembly for removably coupling to an aerosol can, said assembly comprising:

a cap removably coupled to the aerosol can;

a conduit coupled to said cap wherein said conduit is selectively operationally coupled to the aerosol can;

a wheel movably coupled to said cap wherein said wheel adjusts a rate of delivery of a fluid from said conduit;

a tip operationally coupled to said cap wherein said tip selectively directs the delivery of the fluid from the aerosol can;

an outer surface of a coupling portion of said tip threadably engaging an inside surface of a tip aperture wherein said tip is placed in fluid communication with said tip aperture; and an engaging portion of said tip being selectively depressed by a user wherein a dome portion of said cap is positioned in a compressed position wherein a flow of a fluid is released from the aerosol can.

10. The assembly according to claim 1, further comprising a nozzle removably coupled to an engaging portion of said tip wherein said nozzle directs a flow of a fluid outwardly from said tip.

11. The assembly according to claim 10, further comprising said nozzle being one of a plurality of said nozzles.

12. The assembly according to claim 11, further comprising an open end of each of said plurality of said nozzles having one of a plurality of shapes.

13. A reusable valve assembly for removably coupling to an aerosol can, said assembly comprising:

a cap being positionable on the aerosol can such that a bottom edge of a dome portion of said cap engages a top of the aerosol can wherein said cap is retained on the aerosol can wherein a housing portion of said cap is positioned proximate a stem of the aerosol can, said dome portion of said cap being comprised of a resiliently compressible material wherein said dome portion of said cap is positionable between a compressed position and an extended position;

a conduit coupled to and extending downwardly from a bottom of said housing portion of said cap wherein said conduit fluidly engages the stem of the aerosol can when said cap is removably coupled to the aerosol can;

a tip aperture extending downwardly through a top of said housing portion of said cap wherein said tip aperture is aligned with said conduit;

a wheel rotatably coupled to said housing portion of said cap wherein an outside edge of said wheel extends outwardly from a wheel opening in said housing portion of said cap;

a fluid aperture extending through a top and a bottom of said wheel wherein said fluid aperture is aligned between said conduit and said tip aperture, said fluid aperture having a curved teardrop shape wherein said fluid aperture has a wide end and a narrow end, said wheel being selectively positionable wherein said fluid aperture allows a flow of a fluid to move from said conduit to said tip aperture between a minimum and a maximum rate;

a tip selectively coupled to said cap wherein an outer surface of a coupling portion of said tip threadably engages an inside surface of said tip aperture wherein said tip is placed in fluid communication with said tip aperture, an engaging portion of said tip being selectively depressed by a user wherein said dome portion of said cap is positioned in said compressed position wherein the flow of the fluid is released from the aerosol can; and a nozzle removably coupled to said engaging portion of said tip wherein said nozzle directs the flow of the fluid outwardly from said tip, said nozzle being one of a plurality of said nozzles, an open end of each of said plurality of said nozzles having one of a plurality of shapes.

* * * * *